(12) United States Patent
Wiles

(10) Patent No.: US 7,962,556 B2
(45) Date of Patent: Jun. 14, 2011

(54) INSTANT MESSAGING SESSION INITIATION USING A PROXY SESSION REQUEST

(75) Inventor: Michael L. Wiles, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 881 days.

(21) Appl. No.: 11/835,531

(22) Filed: Aug. 8, 2007

(65) Prior Publication Data

US 2009/0043854 A1    Feb. 12, 2009

(51) Int. Cl.
*G06F 15/16* (2006.01)
(52) U.S. Cl. .......................... 709/206; 709/227; 709/204
(58) Field of Classification Search .................. 709/206, 709/227, 204
See application file for complete search history.

(56) References Cited

U.S. PATENT DOCUMENTS

| | | | |
|---|---|---|---|
| 7,016,978 B2 | 3/2006 | Malik et al. | |
| 2002/0062345 A1* | 5/2002 | Guedalia et al. | 709/204 |
| 2003/0185232 A1 | 10/2003 | Moore et al. | |
| 2004/0193722 A1 | 9/2004 | Donovan | |
| 2005/0021645 A1 | 1/2005 | Kulkarni et al. | |
| 2005/0182817 A1* | 8/2005 | Andreev et al. | 709/204 |
| 2005/0198124 A1 | 9/2005 | McCarthy | |

FOREIGN PATENT DOCUMENTS

| | | |
|---|---|---|
| JP | 10154117 | 6/1998 |
| WO | 0193503 A2 | 12/2001 |
| WO | 2004027636 A1 | 4/2004 |

\* cited by examiner

*Primary Examiner* — Dustin Nguyen
*Assistant Examiner* — Joel Mesa

(57) ABSTRACT

A first user of a collaboration application having IM contact information for target users can set up an IM session through the collaboration application that makes of the first user's preferred IM client. The collaboration application responds to the first user's request for an IM session by generating in IM session request that contains IM contact information for both users. The IM session request is forwarded to the IM server associated with the first user's preferred IM client. The IM server sends a session setup request to the first user. The session setup request identifies the second user as the originator of the request. When the first user responds to the message ostensibly sent by the second user, the message is forwarded to the second user to complete the session setup process. In an alternate embodiment, the server sends the request to the IM server for the second user. When the second user responds with an IM message, the message is forwarded to the first user to complete the session setup process.

14 Claims, 7 Drawing Sheets

FIG. 1
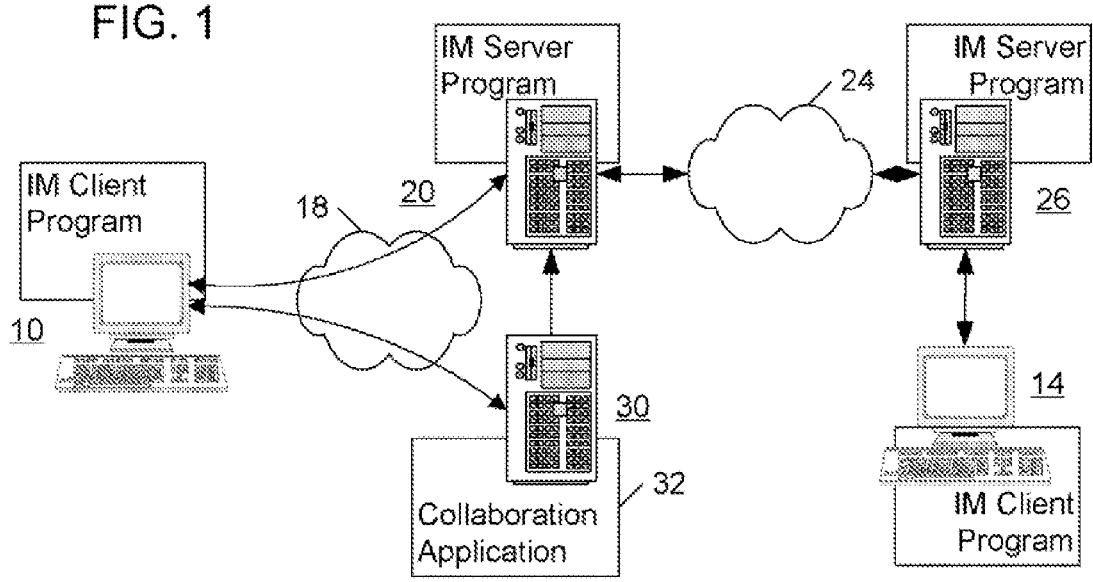
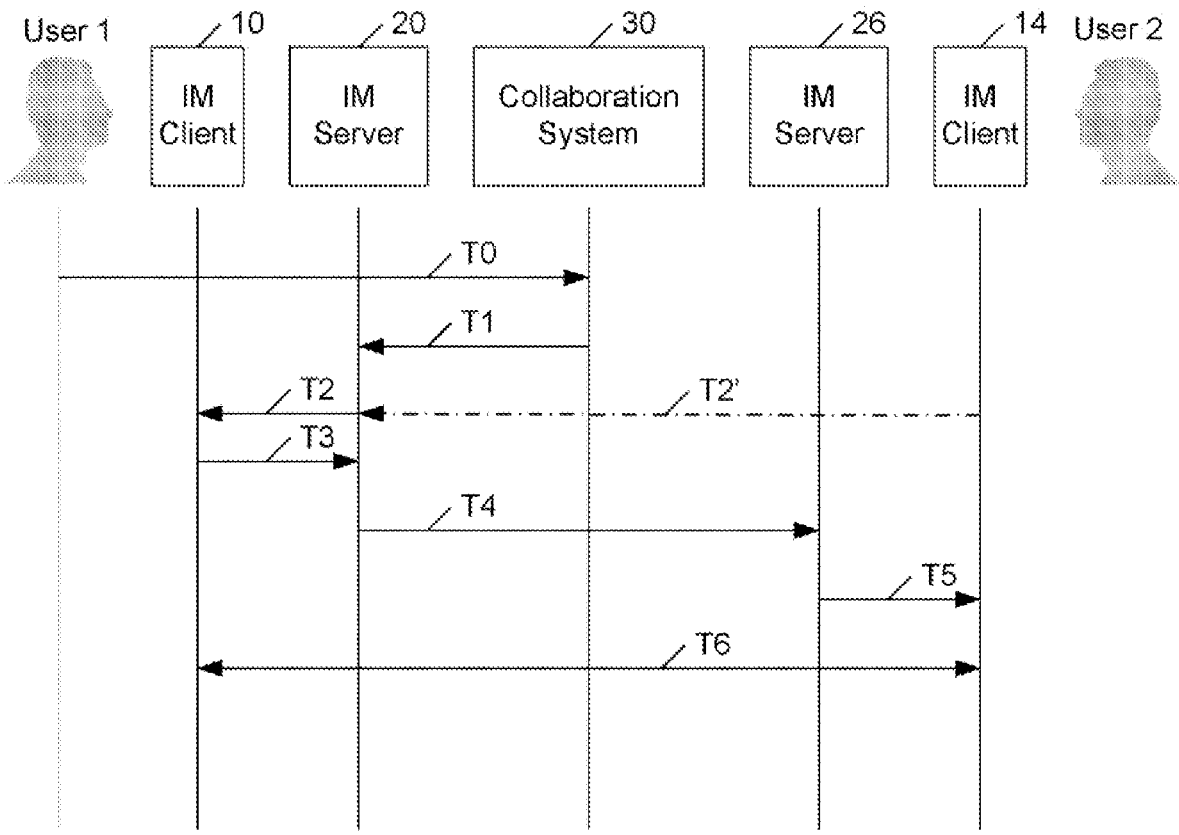
FIG. 2 ial illustration of the major hardware and software components of a system in which the present invention may be implemented.
INSTANT MESSAGING SESSION INITIATION USING A PROXY SESSION REQUEST

BACKGROUND OF THE INVENTION

The present invention relates to instant messaging (IM) in a computer network and more particularly to establishment of an IM session in response to a proxy session request initiated by one of the session participants while using a computer application external to the IM infrastructure.

BRIEF SUMMARY OF THE INVENTION

The invention may be implemented as a method of initiating an IM session between a first IM client and a second IM client. The method is performed in an IM server associated with the first IM client. The IM server receives an IM session request generated in a third system by a user with whom the first IM client is associated. The server responds to the received session request by initiating the requested session between the first IM client and the second IM client.

The invention may also be implemented as a computer program product having a computer usable medium embodying computer usable program code that is executed in an IM server associated with a user of the first IM client. The computer program product includes code configured to receive an IM request from a third system, the request having been generated in the third system by a user of the first IM client. The computer program product also includes code configured to respond to the received request by initiating a session between the first IM client and the second IM client.

Finally, the invention may be implemented as an IM server capable of initiating an IM session between a first IM client and a second IM client. The IM server includes input logic for receiving an IM session request from an external system. The IM session request is generated in the external system in response to a request received from a user of the external system. The IM server also includes logic that responds to the received IM session request by initiating a session between the first IM client and the second IM client.

BRIEF DESCRIPTION OF THE SEVERAL VIEWS OF THE DRAWINGS

FIG. 1 is a pictorial illustration of the major hardware and software components of a system in which the present invention may be implemented.

FIG. 2 is a time-based chart of message flows that occur in one implementation of the present invention.

DETAILED DESCRIPTION OF THE INVENTION

Figure 3:
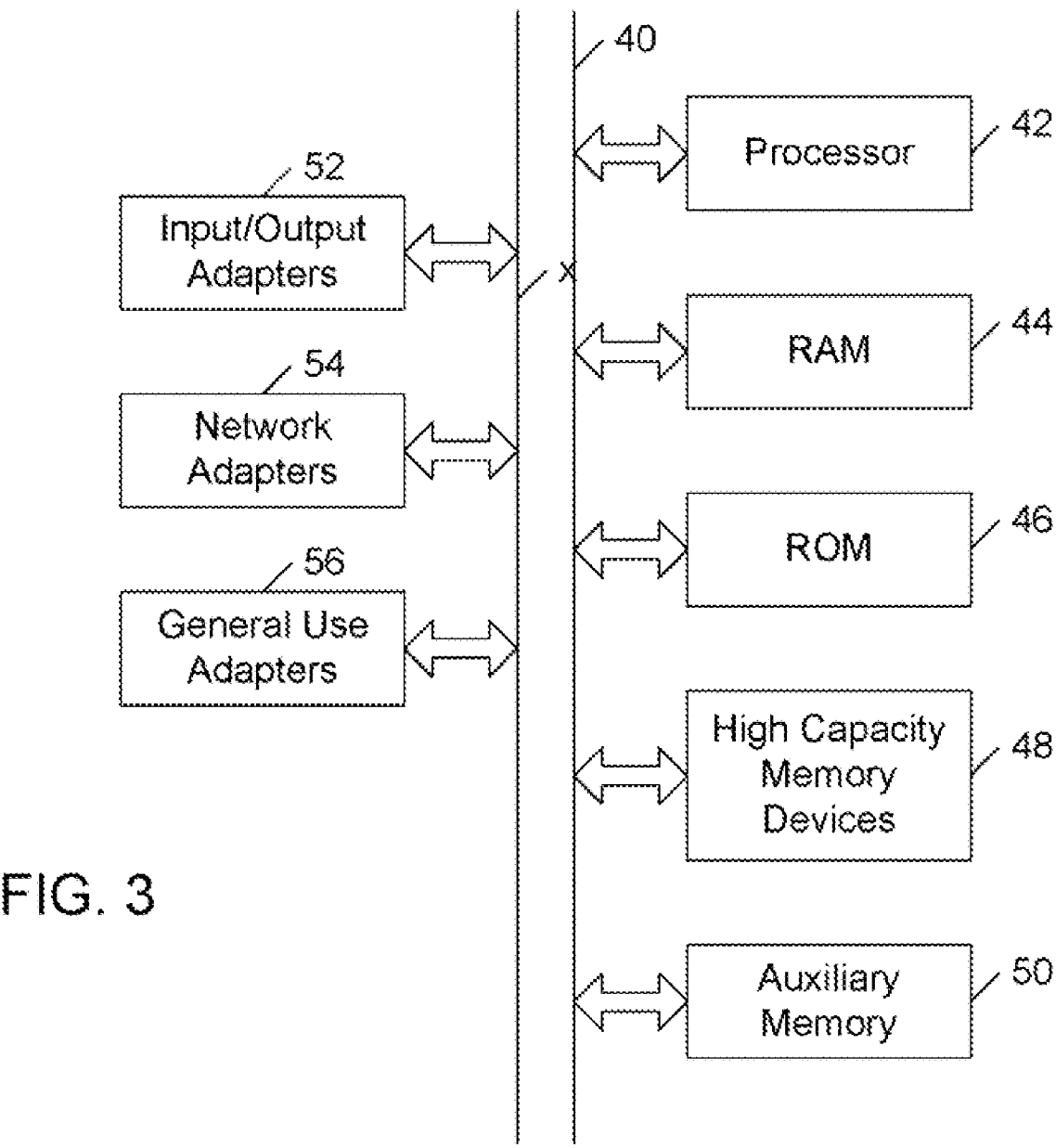
FIG. 3 is a block diagram of the major functional components of an IM server capable of implementing the present invention.

As will be appreciated by one skilled in the art, the present invention may be embodied as a method, system, or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

Referring now to FIG. 1, the different systems shown mere are used in implementing the present invention. A first user (User 1) employs an IM client 10 that includes a personal computer or other workstation running the user's preferred IM client program. The IM client 10 is supported by an IM server 20 that includes a hardware server device running a suitable IM server program. Similarly, a second user (User 2) uses an IM client 14 including a workstation or personal computer running an IM client program selected by or for User 2. IM client 14 is supported by an IM server 26. It is assumed that User 1 is logged onto a collaboration system 30, discussed further below.

In the following description, references to an IM client, an IM server or the collaboration system should be construed as including both the computer applications that perform the client or server or collaboration functions and the hardware devices on which those applications run.

The user of IM client 10 conventionally directly initiates an IM or chat session with the second user of a second IM client 14 after having logged onto IM client 10. As part of the logon process, the first user will have already been provided with network IM addresses and presence information for at least those persons on his personal contact or buddy list. If the second user isn't already on his buddy list, the first user can take the necessary steps to have the second user added to the list. By selecting a name on the buddy list, entering a text or possibly oral message and pressing the Enter key on his system keyboard, the first user instructs the IM client 10 to send a session request through a network 18 to an IM server 20 associated with the IM client 10. The IM server 20 relays the session request through a network 24 to a second IM server 26 associated with the IM client 14 used by the second user.

An IM server ordinarily maintains presence information for each of the IM clients (users) it supports. Typically, the presence information indicates whether a target user of the IM client 14 is logged into the IM client program and, if so, whether the target user is available for a chat session, is temporarily away from the workstation or is at the workstation but does not wish to be disturbed. If the target user is not logged in (that is, is off-line) or is online but has indicated that he does not wish to be disturbed, the IM server will reject an incoming session request without even forwarding it to the target user's client 14. If the target user is online and has either indicated that he is available for a chat session or has indicated that he is temporarily away from the workstation, a session is established between the server 26 and the associated client 14 employed by the target user. Normally, a message previously provided by the first originating user pops up in a chat window on the target user's workstation as part of the session establishment process.

The session setup process described above assumes a server-based IM system in which messages originating at one IM client pass through one or more network servers before reaching the IM client employed by a target user. In a peer-to-peer IM system, the IM client of the originating user may acquire a network address for the IM client for the target user from a system server. The acquired network address can then be used by the originating client to set up a direct or peer-to-peer connection with the target client. As will be seen in the following description, the present invention may be implemented in either a server-based or a peer-to-peer IM system.

One advantage of the conventional approach for setting up an IM session is that the user that originates the session chooses the IM client that he wishes to use during the session.

Under some circumstances, the originating user will not have the option of choosing the IM client that he wants to use. IM users are usually frequent users of collaboration applications, such as a collaboration application 32 running on application server 30. The term "collaboration application" is commonly used to identify programs such as corporate e-mail programs or document creation and management programs but is certainly not limited to those specific types of programs.

A common type of collaboration application includes a directory (or directories) of users with whom IM sessions can be initiated simply by selecting the target user's name (or an appropriately labeled button associated with the target user's name) in a directory entry for the target user.

Such a collaboration application ordinarily includes an internal IM client the originating user is expected to employ if he wants to set up an IM session with a target user selected from a directory listing in the collaboration application.

The internal IM client may (and probably will) lack one or more of the features and functions the originating user has found useful in his preferred IM client. For example, the originating user may find himself unable to store copies of messages exchanged during a session set up through the collaborations system's internal IM client or may be unable to conference in other users in the course of the session.

Rather than forcing a user of the collaboration program to use an IM client resident in the collaboration program, the present invention enables the user to initiate an IM session from within a collaboration application in a manner that assures that the user will be able to use his preferred IM client.

FIG. 2 depicts message flows that occur in setting up an IM session in accordance with the present invention. It is assumed that the originating user, User 1, is already logged onto the collaboration application 32 running on collaboration server 30, has been authenticated by the collaboration application 32 and has decided that he wishes to set up an IM session with a selected target user, User 2. At time T0, User 1 sends a session setup request directly to the collaboration server 30. The session setup request may be an explicit request or may be any action that the collaboration application 32 recognizes as a session setup request. Examples of implicit requests are User 1's selection of a button on a collaboration application screen or User 1's double clicking on User 2's name in a directory listing provided by the collaboration program.

Upon receiving the session setup request, collaboration server 30 verifies the current availability of User 2. At time T1, the collaboration application generates and sends a session setup request to an IM server 20 associated with User 1. Details of one possible session setup message are provided later. Once the collaboration server 30 sends the session setup request to IM server 20, the role of the collaboration application 30 normally ends.

IM server 20 responds to the session setup request at time T2 by sending a session initiation request to the IM client 10 specified by User 1 either as part of the process of logging onto the collaboration application 32 or as part of a dialogue occurring when User 1 makes the session request to collaboration application 32.

The session initiation request sent to the IM client 10 will not identify the collaboration application 32 as the source of the request, however, but will instead the identify User 2 as the ostensible originator of the request, a pretense illustrated by the dashed arrow T2'. At this point, User 2 will still be completely unaware that User 1 would like to chat with him.

When User 1 responds, at time T3, to the chat message apparently originating with User 2 by sending a text or voice message from his preferred IM client 10 to IM server 20, the IM server 20 relays the message directly to the User 2's IM server 26 at time T4. The message originating at User 1's IM client 10 is passed on to User 2's IM client 14 at time T5. The receipt of the message establishes a conventional IM session between the IM clients 10 and 14 for User 1 and User 2, respectively. The conventional IM session is represented by T6.

The systems shown in FIG. 2 may be implemented by programming general purposes hardware devices having the major functional components illustrated in FIG. 3. A general-purpose hardware device typically includes an internal bus 40 that carries data from and instructions among components such as processor 42, random access memory (RAM), read-only memory (ROM) 46, bulk or high-capacity memory devices 48 and auxiliary memory 50. Examples of high-capacity memory devices include magnetic hard drives or optical CD or DVD drives. Examples of auxiliary memory can include solid-state or flash drives having relatively low data storage capacities and, at the other end of the capacity spectrum, magnetic tape drives. A hardware device would also typically include network adapters 54 used to connect the hardware device to other systems through an intervening data network, input/output adapters 52 for devices such as keyboards, mice, printers, monitors and the like, and general use adapters 56. Examples of general use adapters include USB ports and FireWire ports that can be used, among other things, to connect a variety of input/output devices, memory devices or special-purpose devices, an example of which is a fingerprint reader for controlling user access to the hardware.

Figures 4, 5:
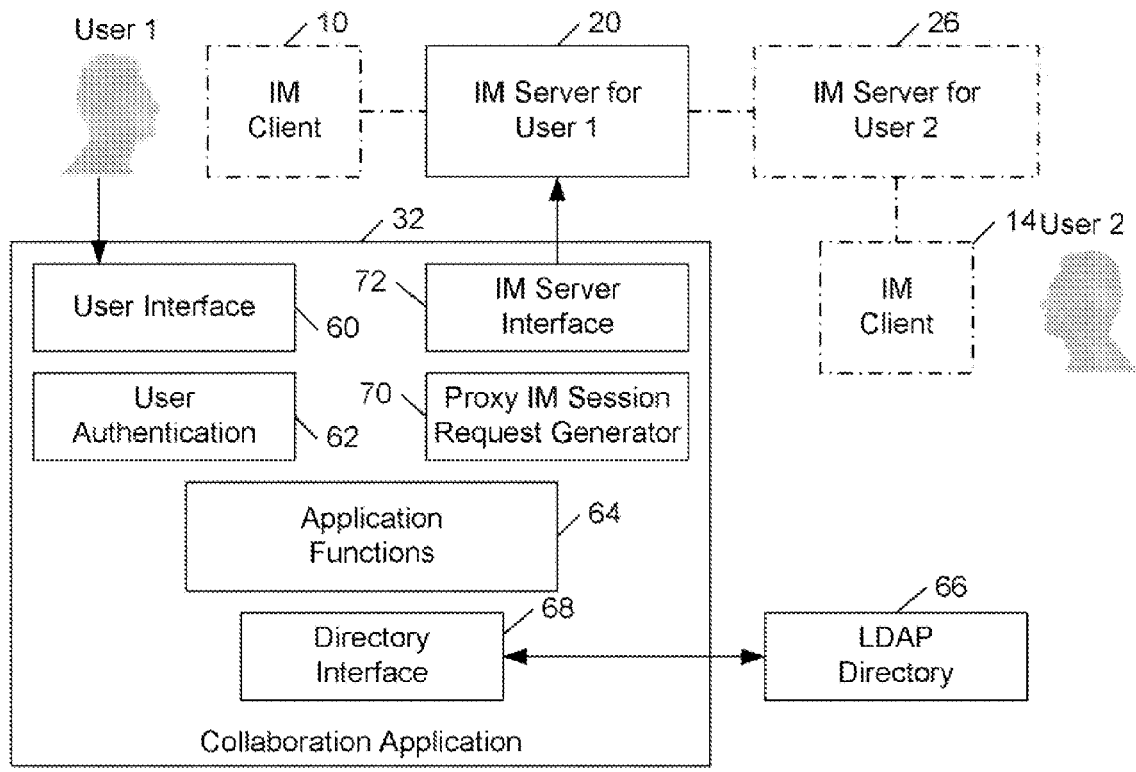
FIG. 4 is a block diagram of the major functional components of a collaboration system for use in implementing the present invention.
FIG. 5 is an illustration of the major fields of a proxy session request generated by the collaboration system at the request of a user of the collaboration system.

FIG. 4 is a block diagram of the elements of a collaboration application 32 that are relevant to an understanding of the present invention. A typical collaboration application will perform many functions that have nothing to do with instant messaging. One common type of collaboration application is a corporate portal that includes information about a company, its products and services and, in some cases, its employees. An instant messaging capability may be included in such an application is part of customer support functions or as part of an employee locator function. In FIG. 4, the collaboration applications that are not relevant to instant messaging are described only generically as application functions 64.

As noted earlier, it is assumed that User 1 is logged on to the collaboration application 32, which will be through a user interface module 60 in the collaboration application 32. The collaboration application 32 includes a user authentication module 62 that is used to establish that the user is who he represents himself to be. The collaboration application 32 also includes or can connect to a user directory that contains contact information, including instant messaging address information, about a number of users. In the illustrated system, the user directory is shown as an external LDAP directory 66 connected to the collaboration application 32 through a directory interface 68 within the application. The collaboration application 32 also includes a proxy IM session request generator 70 and an instant messaging server interface 72.

When an input from User 1 received through the user interface 16 indicates that the user wishes to initiate a chat session with User 2, the collaboration application 32 responds by acquiring the necessary IM contact information for User 2 from a directory entry for that user. It is assumed that User 1 will have already provided his IM contact information either during the initial logon, during authentication or as part of the session initiation request.

A proxy IM session request generator 70 assembles the information into a session request message that is forwarded to the IM server 20 supporting User 1's preferred IM Client 10. The significant fields in that message are shown in FIG. 5. The message must, of course, include an IM server address field 80 and a command field 82 that will be interpreted as a session setup request by the IM server receiving the message. The message will also include both IM contact information and presence information for each of the two participants in the planned IM session. Specifically, the message will include User 1 IM address information in the field 84 and User 1 presence information in the field 86. Similarly, IM contact information and presence information about User 2, the target user, are included in fields 88 and 90, respectively, of the message.

Figure 6:
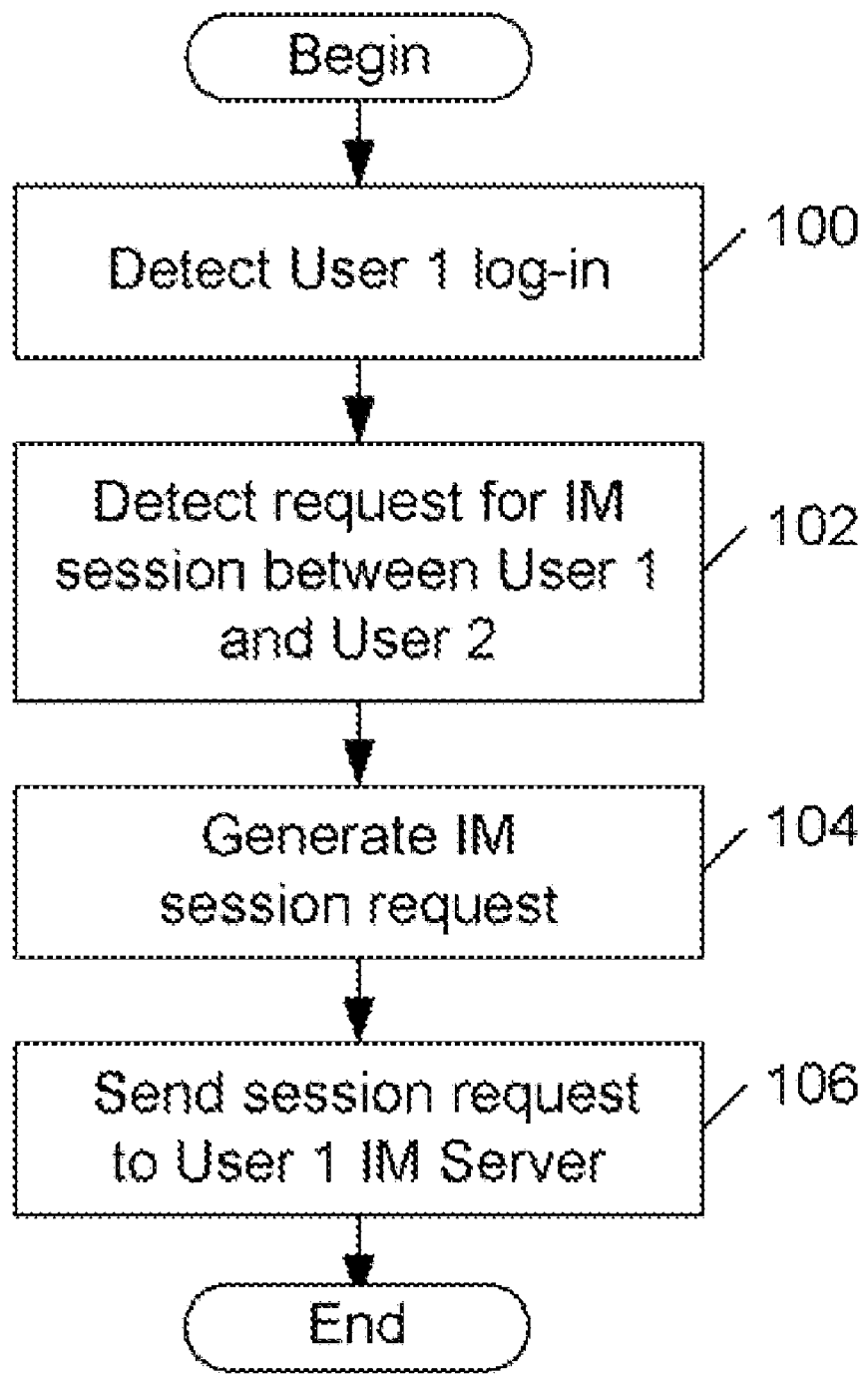
FIG. 6 is a flow chart of operations that are performed in the collaboration system in one embodiment of the present invention.

While there may be a considerable number of interactions between User 1 and the collaboration application 32, relatively few of those interactions will relate to setting up an IM session between User 1 and User 2. FIG. 6 is a flow chart of IM-related operations that are performed in the collaboration server. The initial operation 100 is the detection of User 1's login to the collaboration server. As noted earlier, User 1 may provide IM contact information as part of the login process. It is not necessary that User 1 provide explicit presence information since the login itself implicitly establishes User 1's presence. The second IM-related operation 102 is the detection of User 1's request for an IM session with User 2. The collaboration server generates, in step 104, the IM session request discussed earlier and sends that request to the User 1's IM server in an operation 106. In one embodiment of the invention, the collaboration server then "drops out" of the process of setting up the IM session. In a preferred embodiment, User 1 remains logged onto the collaboration server even after the collaboration server has handed off the responsibility of setting up the IM session to the IM server associate with User 1.

Figure 7:
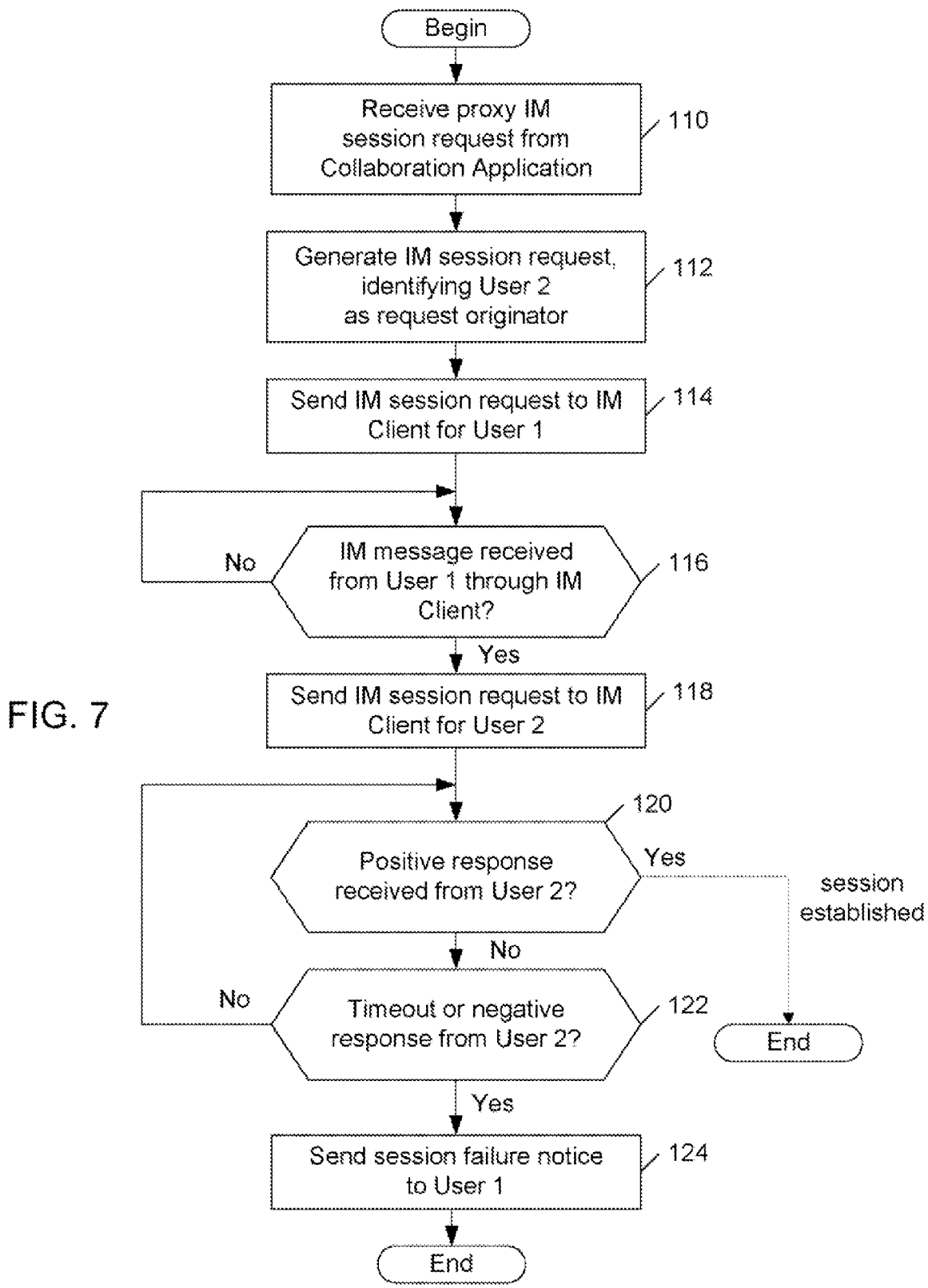
FIG. 7 is a flow chart of operations that are performed in an IM server in one embodiment of the present invention.

FIG. 7 is a flow chart of operations performed in the IM server that, in step 110, receives the proxy IM session request from the collaboration application. The IM server responds to the session request by generating, in step 112, a session request that uses a standard format but which identifies User 2 as the originator of the request. The IM server sends the generated session request to the IM client for User 1 in an operation 114. A standard text or oral message is preferably included in the request to make it clear that the request relates to the session that User 1 actually requested through the collaboration application.

In one embodiment, the IM server enters a wait loop 116 that continues until a response is received from User 1 through the IM client. Once that response is received, a session request is sent in step 118 to the IM server for User 2. User 2's IM server will forward the session request to User 2's IM client, but this operation is not illustrated as it is performed external to User 1's IM server. The IM server will periodically look either for a positive response (operation 120) or an indication (operation 122) that a timeout period has expired or that a negative response has been received from User 2. A negative response is any response, either from User 2's IM server or User 2's IM client indicating User 2 is not available to chat. If a positive response is received first, that response completes the session establishment process. If a timeout or negative response is received first, a session failure notice is sent to User 1 in an operation 124.

Figure 8:
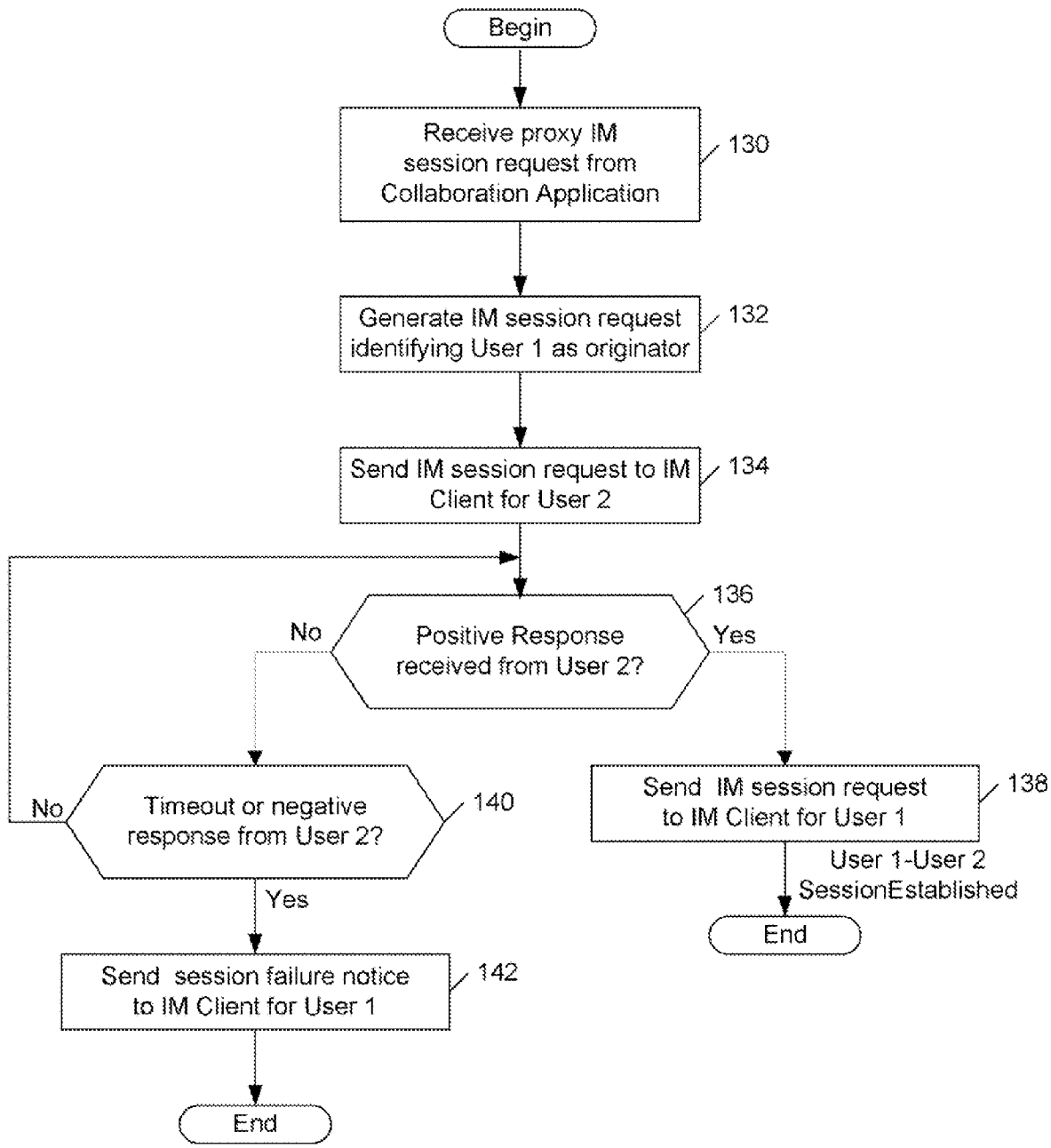
FIG. 8 is a flow chart of operations that are performed in an IM server in another embodiment of the present invention.
Figure 9:
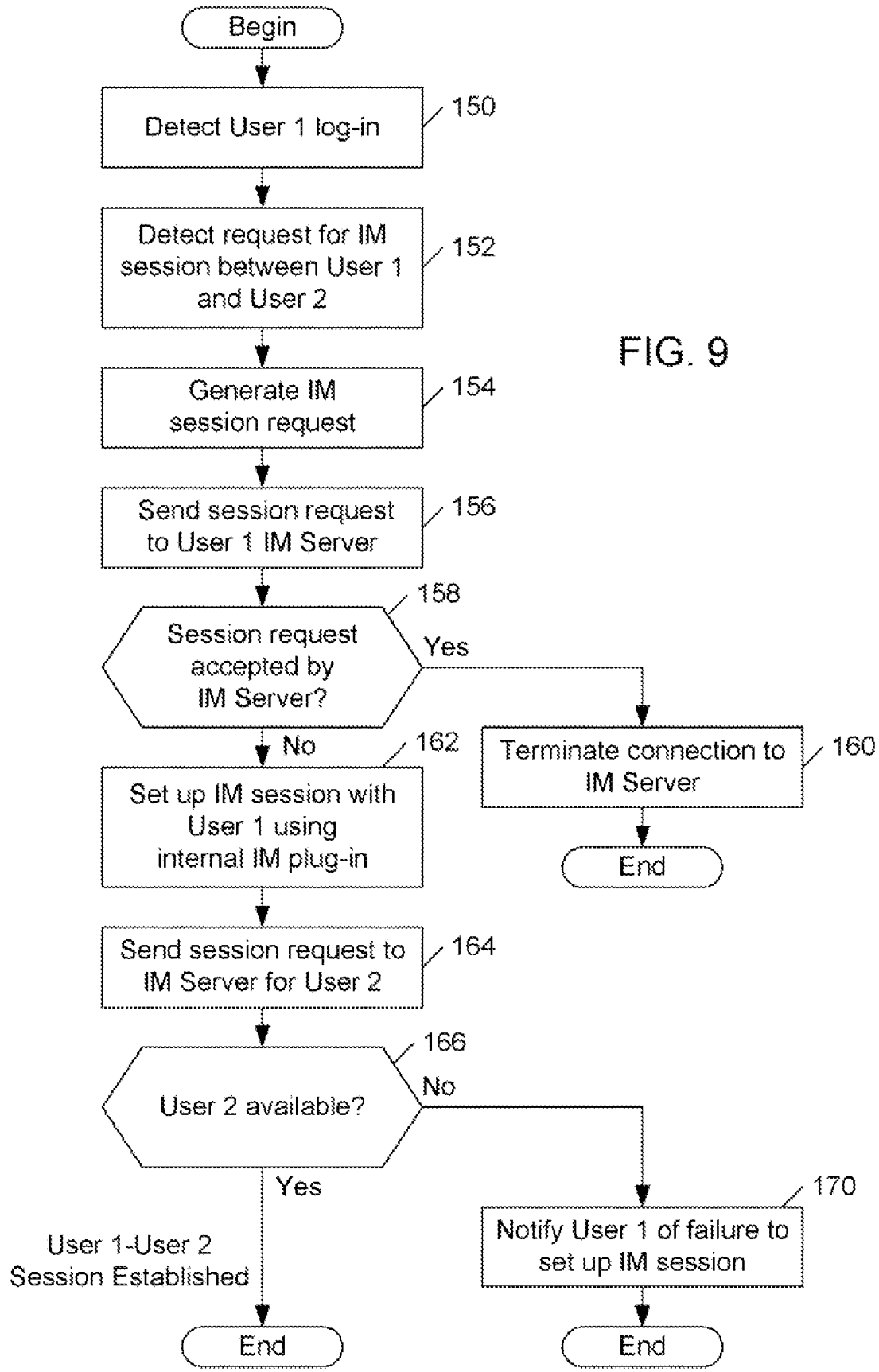
FIG. 9 is a flow chart of operations that are performed in the collaboration system in one embodiment of the present invention.

FIG. 8 is a flow chart of operations that would be performed in the IM server for User 1 in an alternate embodiment of the present invention. As in the previously discussed embodiment, the IM server receives a proxy IM session request from the collaboration application in an operation 130 and generates an IM session request message in an operation 132. However, in the alternate embodiment, the IM session request generated in operation 132 identifies User 1 as the originator of the message.

The generated session request is sent to User 2, rather than User 1, in an operation 134. The reason for sending the session request to User 2 is that it is already known that User 1 is ready and available for a chat session with User 2. Notwithstanding that presence information currently available to the collaboration application 32 indicates that User 2 is available, there is a greater risk that User 2 may not actually be available, either because he walked away from his desk without changing his IM presence indicator or because he is at his desk but is preoccupied with another matter.

Since a blank IM message ostensibly from User 1 may not be enough to encourage User 2 to respond, the IM server may insert a "canned" system message into the message sent to User 2; e.g., "Do you have time for a chat now?".

After sending the session request to User 2, the IM server sets up a wait loop comprising operations 136 and 140. In this loop, the IM server checks for a positive response from User 2 in an operation 136. If a positive response (i.e., "I'm ready to chat") is received from User 2, then the IM server sends a session request to User 1's IM client in operation 138. Sending the session request to User 1 invokes User 1's preferred IM client and completes a session between Users 1 and 2.

If, however, User 2 fails to respond within a predetermined timeout or responds negatively, operation 140 triggers an operation 142 that causes a session failure notice to be delivered to the IM client for User 1.

In both embodiments described above, the collaboration application 32 disengages from the chat session setup process once a session request is generated and sent to the IM server for User 1. In one embodiment of the invention, illustrated in FIG. 6, the collaboration application 32 does not automatically disengage from the session setup process once it sends the session setup request to the IM server. The initial steps in the process are essentially those practiced in the previously-described embodiments. The collaboration application detects a log-in by User 1 in an operation 150 and User 1's chat session request in an operation 152. Once the IM session request is generated in operation 154, it is forwarded to the IM server for User 1 in operation 156.

The collaboration application then waits (operation 158) for the IM server to accept the session request. By accepting the session request, the IM server assumes responsibility for setting up the chat session while the collaboration application 32 terminates its connection to the IM server in an operation 160.

If the IM server rejects the session request or fails to respond to it (possibly because the server has gone off-line for some reason), the wait operation 158 being performed in the collaboration application triggers an attempt to set up a chat session between Users 1 and 2 using the collaboration application's internal IM plug-in. An IM session with User 1, already logged onto the collaboration application, is set up in operation 162 and a session request is forwarded to the IM server for User 2 in operation 164. The collaboration application then waits to see if User 2 is available (operation 166). If User 2 is not available, User 1 is notified (operation 170) of the failure to set up an IM chat session and the session setup process ends. If User 2 is available, an IM session is established between Users 1 and 2 through the collaboration application 32.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to preferred embodiments thereof, it will be apparent that modifications and variations are possible without departing from the scope of the invention defined in the appended claims.

What is claimed is:

1. A method of initiating a IM session between a first IM client and a second IM client, said method being performed in an IM server associated with the first IM client and comprising:
   receiving a first IM session request from a third system, said first IM session request being generated in the third system at the request of a user of the first IM client;
   verifying the availability of said second IM client at the third system; and
   responding to the received first IM session request by initiating a session between the first IM client and the second IM client by
      sending an IM session request to the first IM client, said session request identifying the second IM client as the originator of the request; and
      sending an IM session request to the second IM client, said session request identifying the first IM client as the originator of the request.

2. A method according to claim 1 wherein the IM session requests sent to the first IM client and the second IM client include IM address information obtained from a directory in the third system for at least the second IM client.

3. A method according to claim 1 wherein initiating a session between the first IM client and the second IM client further comprises responding to an instant message received from the first IM client over the established IM session by forwarding the received message to the second IM client to create an IM session between the first IM client and the second IM client.

4. A method according to claim 1 wherein sending an IM session request to the first IM client further comprises responding to an acceptance of the IM session request by the second IM client by sending a session request to the first IM client.

5. A computer program product comprising a nontransitory computer usable medium having computer usable program code embodied therewith for initiating an IM session between a first IM client and a second IM client, said computer program product being executed in an IM server associated with the first IM client, said computer usable program code comprising:
   computer usable program code for receiving a first IM session request from a third system, said first IM session request being generated in the third system at the request of a user of the first IM client;
   computer usable program code for verifying the availability of said second IM client at the third system; and
   computer usable program code for responding to the received first IM session request by initiating a session between the first IM client and the second IM client by
      sending an IM session request to the first IM client, said session request identifying the second IM client as the originator of the request, and
      sending an IM session request to the second IM client, said session request identifying the first IM client as the originator of the request.

6. A computer program product according to claim 5 wherein the IM session requests sent to the first IM client and the second IM client include IM address information obtained from a directory in the third system for at least the second IM client.

7. A computer program product according to claim 5 wherein the computer usable program code for responding to the received IM session request by initiating a session between the first IM client and the second IM client further comprises computer usable program code for responding to an instant message received from the first IM client over the established IM session by forwarding the received message to the second IM client to create an IM session between the first IM client and the second IM client.

8. A computer program product according to claim 5 wherein the computer usable program code for sending an IM session request to the first IM client further comprises computer usable program code for responding to an acceptance of the IM session request by the second IM client by sending a session request to the first IM client.

9. An instant messaging server for initiating a IM session between a first IM client and a second IM client, said instant messaging server including a processor and memory comprising:
   input logic for receiving a first IM session request from an external system, said first IM session request having been generated by the external system in response to a request received from a first user of the external system;
   server logic for verifying the availablity of said second IM client at the external system;
   server logic for responding to the received first IM session request by initiating a session between the first IM client and the second IM client by
      sending an IM session request to the first IM client, said session request identifying the second IM client as the originator of the request; and
      sending an IM session request to the second IM client, said session request identifying the first IM client as the originator of the request.

10. An instant messaging server according to claim 9 wherein the IM session requests sent to the first IM client and the second IM client include IM address information for at least the second IM client, the IM address information being obtained from a directory in the external system.

11. An instant messaging server according to claim 9 wherein the server logic for initiating a session between the first IM client and the second IM client further comprises logic for responding to an instant message received from the first IM client over the established IM session by forwarding the received message to the second IM client to create an IM session between the first IM client and the second IM client.

12. An instant messaging server according to claim 10 wherein the server logic for sending an IM session request to the first IM client further comprises logic for responding to an acceptance of the IM session request sent to the second IM client by sending a session request to the first IM client.

13. A method of initiating a IM session between a first IM client and a second IM client, said method being performed in a collaboration server being accessed by a user of the first IM client and comprising:
   receiving a request from the user for an IM session between the first IM client and the second IM client;
   authenticating the requesting user;
   retrieving IM address information for the second IM client from a directory accessible by the collaboration server;
   verifying the availability of said second IM client;
   generating an IM session request identifying the first IM client and the second IM client as session participants;

sending the generated IM session request to an IM server associated with the first IM client, said generated IM session request identifying the second IM client as the originator of the request.

14. A method as set forth in claim 13 further comprising:
detecting a failure of the IM server associated with the first IM client to accept the generated IM session request; setting up a session between the IM server associated with the second IM client and first user associated with the first IM client using an IM client program resident in the collaboration server.

* * * * *